US010372791B2

(12) United States Patent
Thomas et al.

(10) Patent No.: US 10,372,791 B2
(45) Date of Patent: Aug. 6, 2019

(54) CONTENT CUSTOMIZATION

(71) Applicant: Staples, Inc., Framingham, MA (US)

(72) Inventors: Paul Derek Thomas, Vancouver (CA); Young-Keun Andrew Lee, Vancouver (CA)

(73) Assignee: Staples, Inc., Framingham, MA (US)

( * ) Notice: Subject to any disclaimer, the term of this patent is extended or adjusted under 35 U.S.C. 154(b) by 693 days.

(21) Appl. No.: 14/608,152

(22) Filed: Jan. 28, 2015

(65) Prior Publication Data
US 2016/0103923 A1 Apr. 14, 2016

Related U.S. Application Data

(60) Provisional application No. 62/061,576, filed on Oct. 8, 2014.

(51) Int. Cl.
*G06F 17/00* (2019.01)
*G06F 17/21* (2006.01)
*G06F 16/9535* (2019.01)

(52) U.S. Cl.
CPC ........ *G06F 17/218* (2013.01); *G06F 16/9535* (2019.01)

(58) Field of Classification Search
CPC ........ G06F 17/21; G06F 17/218; G06F 17/30; G06F 17/30867; G06F 16/9535
See application file for complete search history.

(56) References Cited

U.S. PATENT DOCUMENTS

| | | | | |
|---|---|---|---|---|
| 6,212,536 B1* | 4/2001 | Klassen | ............... | G06F 17/3089 707/E17.116 |
| 8,549,472 B1* | 10/2013 | Tilwani | ................ | G06F 17/218 709/208 |
| 2007/0143715 A1* | 6/2007 | Hollins | ............... | G06F 3/03545 715/863 |
| 2007/0198506 A1* | 8/2007 | Attaran Rezaei | ......................... | G06F 17/30675 |
| 2010/0125539 A1* | 5/2010 | Aucouturier | ...... | G06F 17/30265 706/12 |
| 2011/0145732 A1* | 6/2011 | Brindley | ........... | G06F 17/30038 715/760 |
| 2011/0191691 A1* | 8/2011 | Spears | .............. | G06F 17/30038 715/748 |
| 2011/0258049 A1* | 10/2011 | Ramer | ............. | G06F 17/30867 705/14.66 |
| 2011/0265011 A1* | 10/2011 | Taylor | .................... | G06Q 50/01 715/751 |
| 2013/0212497 A1* | 8/2013 | Zelenko | ............ | G06F 17/30867 715/760 |
| 2014/0026081 A1* | 1/2014 | O'donnell | ......... | G06F 17/30699 715/760 |

* cited by examiner

*Primary Examiner* — Stephen S Hong
*Assistant Examiner* — Marshon L Robinson
(74) *Attorney, Agent, or Firm* — Patent Law Works LLP

(57) ABSTRACT

A computer-implemented method and system are described for customizing content displayed to a user on a user device associated with the user. An example method may include receiving interaction data describing interactions by a user with one or more pages presented on a user device of the user, building a tag expression for the user based on the interaction data, the tag expression including a logical expression of tags and Boolean logic operators, and the tags being associated with page items. The method may also include generating a content page with a customized result customized to the user based on the tag expression.

14 Claims, 12 Drawing Sheets

Figure 7

CONTENT CUSTOMIZATION

CROSS-REFERENCE TO RELATED APPLICATIONS

This application claims the benefit under 35 U.S.C. § 119(e) of U.S. Provisional Application No. 62/061,576, entitled "Content Customization", filed on Oct. 8, 2014, the entire contents of which is incorporated herein by reference.

BACKGROUND

The present disclosure relates generally to content customization based on user interaction.

Use of web-based applications, such as websites, mobile apps, and various cloud-based services has soared in recent years. Using these applications, users have become accustomed to communicating with others, performing research, and purchasing merchandise online. However, user experience on one or another application tends to be the same or substantially similar, even if the users have different preferences and interests. Some solutions have attempted to customize the user experience by allowing users to set preferences, such as layout preferences, content preferences (e.g., specifying certain topics or products of interest), etc. However, these preferences can become outdated, as they generally require the user to maintain and/or update the preferences.

Other solutions attempt to dynamically adapt the users' experience based on previous requests, such as previous products and/or services purchased by the users or by other users. For example, for a given product that a user may be interested in, an application may determine other related products that other users purchased and suggest them to that user. However, these suggestions do not adequately account for each user's specific interests or intentions, but are instead based on what other users have done previously.

In addition, while some online marketplaces organize products using categories, these marketplaces provide the same list of products to each user when those users browse the categories. As a result, all users have the same shopping experience regardless of contextual information about the user and/or the user's shopping context. This can be frustrating to users as they are left to manually sift through and/or sort sometimes hundreds or thousands of irrelevant products using limited navigational options before finding something of interest. Consequently, many users leave the sites without making any purchases and after looking at only a page or two of results, which ultimately results in the loss of potential sales opportunities.

SUMMARY

According to one innovative aspect of the subject matter described in this disclosure, a computer-implemented method includes associating, using one or more computing devices, interaction data describing interactions by the user with one or more pages presented on a user device of a user with a user profile of the user in a non-transitory data store, determining, using the one or more computing devices, one or more target pages with which the user has interacted from the interaction data, determining, using the one or more computing devices, that one or more existing tags are pre-associated with each of the one or more target pages in the non-transitory data store, for each of the one or more target pages pre-associated with the one or more existing tags, retrieving, using the one or more computing devices, the one or more existing tags from the non-transitory data store, for each of the one or more target pages not pre-associated with the one or more existing tags, dynamically generating, using the one or more computing devices, one or more new tags based on attributes of that target page, building, using the one or more computing devices, a tag expression for the user based on the interaction data by coupling together one or more of the one or more existing tags and the one or more new tags using Boolean logic operators in a logical expression, generating, using the one or more computing devices, a content page including one or more customized results customized to the user based on the tag expression by incorporating page items matching the tags and Boolean logic operators in the tag expression into the content page, and sending, using the one or more computing devices, the content page including the one or more customized results to a user device of the user for presentation to the user.

In general, according to another innovative aspect of the subject matter described in this disclosure may be embodied in a computer-implemented method that includes receiving, using one or more computing devices, interaction data describing interactions by a user with one or more pages presented on a user device of the user, building, using the one or more computing devices, a tag expression for the user based on the interaction data, the tag expression including a logical expression of tags and Boolean logic operators, the tags being associated with page items, and generating, using the one or more computing devices, a customized result including a product customized to the user based on the tag expression.

These and other implementations may each optionally include one or more of the following features and/or operations. For instance, that generating the one or more customized results including a product further includes determining, using the one or more computing devices, a site mode based on the tag expression, the site mode affecting a user interface displaying the content page, that the tag expression includes one or more capability tags reflecting capabilities of the user device associated with the user, receiving, using the one or more computing devices, a request to send a content page to the user device associated with the user, sending, using the one or more computing devices, the content page including the customized result to the user device for presentation to the user, associating, using the one or more computing devices, the interaction data with a user profile of the user in a non-transitory data store, determining, using the one or more computing devices, an interaction by the user with a target page included in the one or more pages, the interaction being described by the interaction data, determining, using the one or more computing devices, one or more tags associated with the target page, that determining the one or more tags associated with the target page includes determining, using the one or more computing devices, that a predetermined tag exists and is pre-associated with the target page in the non-transitory data store, and retrieving, using the one or more computing devices, the predetermined tag for the target page from the non-transitory data store, that building the tag expression for the user based on the interaction data includes incorporating the predetermined tag into the tag expression, that building the tag expression for the user based on the interaction data includes coupling, using the one or more computing devices, a plurality of tags together using Boolean logic operators, that coupling the plurality of tags together using Boolean logic operators includes coupling, using the one or more computing devices, compatible tags together using an AND type Boolean operator, and coupling, using the one or more computing devices, incompatible tags together using an OR type Boolean operator, that generating the customized result including a product customized to the user based on the tag expression includes incorporating page items matching the tags and Boolean logic operators in the tag expression into the customized result, that the page items include a site mode affecting the user interface displaying the content page, that the tag expression includes a capability tag reflecting a capability of the user device associated with the user, and the site mode is selected based on the capability tag.

In general, according to yet another innovative aspect of the subject matter described in this disclosure may be embodied in a system that includes one or more memories, one or more processors, an interaction handler storable in the one or more memories and executable by the one or more processors to receive interaction data describing interactions by a user with one or more pages presented on a user device of the user, a tag expression engine storable in the one or more memories and executable by the one or more processors to build a tag expression for the user based on the interaction data, the tag expression including a logical expression of tags and Boolean logic operators, the tags being associated with page items, and a resolver storable in the one or more memories and executable by the one or more processors to generate a customized result including a product customized to the user based on the tag expression, the interaction handler, the tag expression engine, and the resolver being coupled for communication with one another.

These and other implementations may each optionally include one or more of the following features and/or operations. For instance, an e-commerce engine storable in the one or more memories executable by the one or more processors to receive a request to send a content page to the user device associated with the user and send the content page including the customized result to the user device for presentation to the user, that the computing system further comprises a non-transitory data store, that the interaction handler is further configured to associate the interaction data with a user profile of the user in the non-transitory data store and determine an interaction by the user with a target page included in the one or more pages, the interaction being described by the interaction data, that the computing system further comprises a tagging module storable in the one or more memories and executable by the one or more processors to determine one or more tags associated with the target page, that the tag expression engine is further executable to determine one or more tags associated with the target page by determining that a predetermined tag exists and is pre-associated with the target page in the non-transitory data store, and retrieving the predetermined tag for the target page from the non-transitory data store, that the tag expression engine is further executable to build the tag expression for the user based on the interaction data by incorporating the predetermined tag into the tag expression, that the tag expression engine is further executable to build the tag expression for the user based on the interaction data by coupling a plurality of tags together using Boolean logic operators, coupling the plurality of tags together using Boolean logic includes coupling compatible tags together using an AND type Boolean operator, and coupling incompatible tags together using an OR type Boolean operator, that the resolver is further executable to generate the customized result including a product customized to the user based on the tag expression by incorporating page items matching the tags and Boolean logic operators in the tag expression into the customized result, that the page items include a site mode affecting the user interface displaying the content page, and that the tag expression includes a capability tag reflecting a capability of the user device associated with the user, and the site mode is selected based on the capability tag.

Other innovative aspects include corresponding systems, methods, apparatus, and computer program products.

The disclosure is particularly advantageous over other existing solutions in a number of respects. By way of example and not limitation, the technology described herein can track a user's interactions with various online content, estimate that user's intentions and interests, and customize content pages accordingly.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is an example graphical user interface showing a category as determined by the resolver.

DETAILED DESCRIPTION

Figure 1:
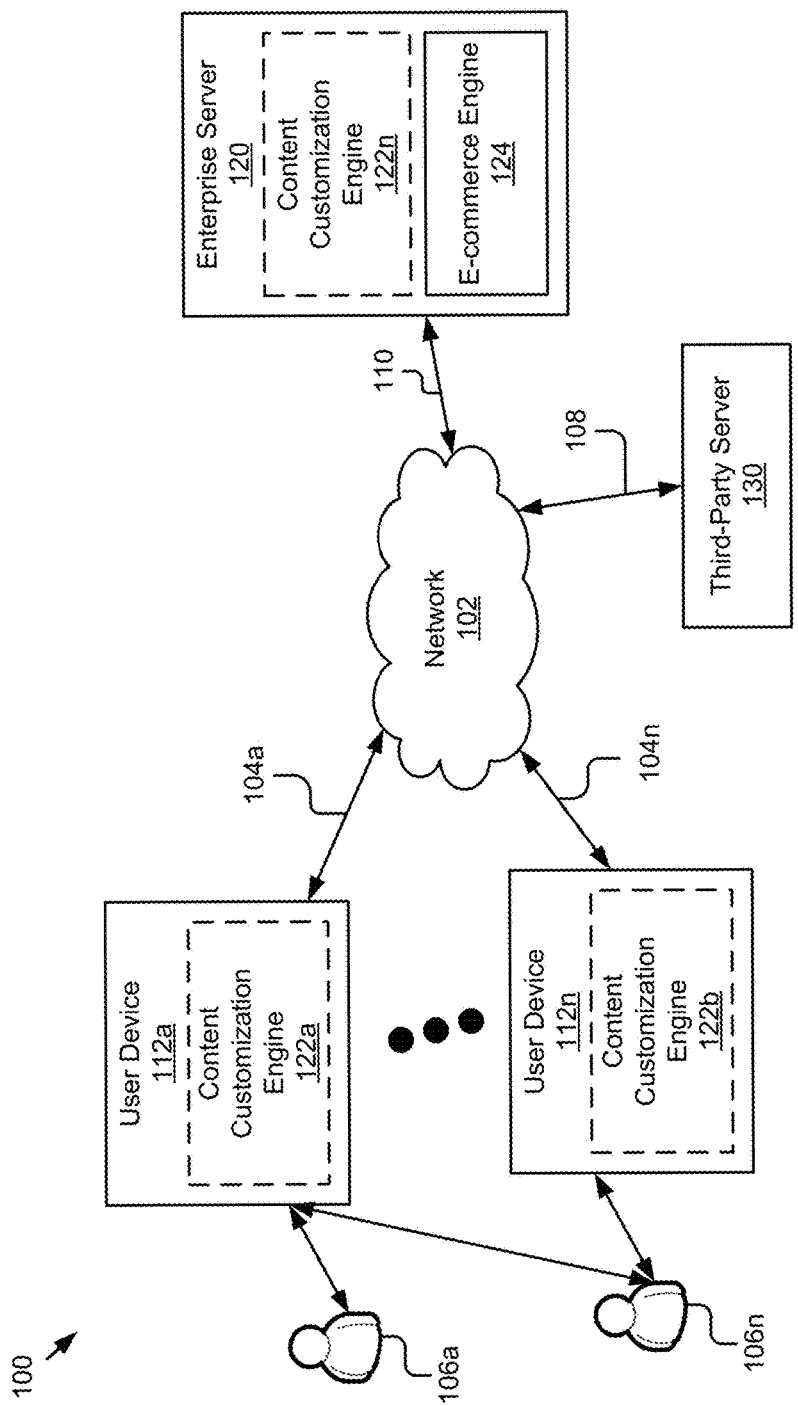
FIG. 1 is a block diagram illustrating an example system for customizing content based on tag expressions.

FIG. 1 is a block diagram of an example system 100 for customizing content (e.g., a content page including results) based on tag expressions. The illustrated system 100 may include user devices 112a . . . 112n (also referred to herein individually and/or collectively as 112), a third-party server 130, and an enterprise server 120, which are electronically communicatively coupled via a network 102 for interaction with one another, although other system configurations are possible including other devices, systems, and networks. For example, the system 100 could include any number of user devices 112, enterprise servers 120, third-party servers 130, and other systems and devices. The user devices 112a . . . 112n, and their components, may be coupled to the network 102 via signal lines 104a . . . 104n, respectively. The enterprise server 120 and its components may be coupled to the network 102 via signal line 110. The third-party server 130 and its components may be coupled to the network 102 via signal line 108. The users 106a ... 106n may access one or more of the devices of the system 100. For example, as depicted, user 106a may access the user device 112 in an implementation, and user 106n may access either/both user devices 112a and 112n (e.g., a smartphone and a laptop).

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

A user device 112 includes one or more computing devices having data processing and communication capabilities. In some implementations, a user device 112 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The user device 112 may couple to and communicate with other user devices 112, the enterprise server 120, the third-party server 130, and the other entities of the system 100 via the network 102 using a wireless and/or wired connection.

Examples of user devices 112 may include, but are not limited to, mobile phones, tablets, laptops, desktops, netbooks, server appliances, servers, virtual machines, TVs, set-top boxes, media streaming devices, portable media players, navigation devices, personal digital assistants, etc. The system 100 may include any number of user devices 112. In addition, the user devices 112 may be the same or different types of computing devices.

The content customization engine 112 may be hosted by a computing system (e.g., the enterprise server 120) on the network 102, may be distributed across one or more computing systems (e.g., the enterprise server 120 and a user device 112, user devices 112), etc. The instances of the content customization engine 122a ... 122n may be referred to herein independently and/or collectively as 122. The user devices 112 may store and/or operate other software such as an internet browser, operating system, other applications, etc., that are configured to interact with the enterprise server 120, the third-party server 130, and/or other elements of the system 100 via the network 102.

In an example, instances including various aspects of the content customization engine 112 may be stored and operable on the user devices 112a ... 112n and the enterprise server 120. In a further example, the user devices 112a and 112n may include client-side instances of the content customization engine 122a and 122b, respectively, and the enterprise server 120 may include a server-side instance of the content customization engine 122n. In this example, the client-side instances may embody a client application operable generate and display user interfaces displaying a content page generated by the e-commerce engine 124, the third-party server 130, and/or the content customization engine 122, receive and interpret user input, send requests to and receive responses from the other entities of the network 102, facilitate user purchases of products, etc.

In an example, the client-side instances may be code interpretable by another user application, such as a web browser or a mobile application stored and operable by the user device 112. In an example, the content customization engine 122 may reside on one or more servers, such as the enterprise server 120 and the user may interact with the content customization engine 122 via an application operable by the user device 112 of the user, such as a web browser or mobile application. Other variations are also possible and contemplated.

The enterprise server 120 may include one or more computing devices having data processing, storing, and communication capabilities. For example, the enterprise server 120 may include one or more hardware servers, server arrays, storage devices and/or systems, etc. In some implementations, the enterprise server 120 may include one or more virtual servers, which operate in a host server environment and access the physical hardware of the host server including, for example, a processor, memory, storage, network interfaces, etc., via an abstraction layer (e.g., a virtual machine manager). In some implementations, the enterprise server 120 may include a web server (not shown), a REST (representational state transfer) service, or other server type, having functionality for satisfying content requests and receiving content from one or more computing devices that are coupled to the network 102 (e.g., the user device 112, etc.).

In the depicted implementation, the enterprise server 120 may include a content customization engine 122 and an e-commerce engine 124. The e-commerce engine 124 is operable to provide an e-commerce service/marketplace for various products and may store and provide access to product information (e.g., images, descriptions, categories, specifications, reviews, ratings, retailers, etc.) in a data store, such as the data store 208 (e.g., see FIG. 2A). For example, the e-commerce engine 124 may serve a content (e.g., webpages, structured data, etc.) page customized at least in part by the content customization engine 122, and requested by the user devices 112, as discussed in further detail elsewhere herein.

The e-commerce engine 124 may place and provide for order fulfillment for the products (e.g., print products, office products, consumer products, online services, home or business services, etc.) including order delivery status and item returns. In an example, a user 106 may place orders for and/or pay for products, such as holiday cards, printer materials, other products, consumer or business services, etc., ordered on an e-commerce marketplace using a user device 112.

In some implementations, the e-commerce engine 124 may include computer logic executable by the processor(s) 204 (e.g., see FIG. 2A) to receive, manage, analyze, store, and provide access to inventory, sales, rewards, and product data and for analyzing the data managed by it to generate analytics and reports for review by management to assess the performance and effectiveness of the enterprise server 120.

In some implementations, the e-commerce engine 124 and/or content customization engine 122 may require users 106 to be registered to access the services/functionality provided by them. For example, to access various services/functionality provided by the e-commerce engine 124 and/or content customization engine 122, they may require a user 106 to authenticate his/her identity (e.g., by confirming a valid electronic address). In some instances, the entities 124 and/or 122 may interact with a federated identity server (not shown) to register/authenticate users 106 and/or user devices 112. Once registered, these entities 124 and/or 122 may require a user 106 seeking access to authenticate by inputting credentials in an associated user interface, and responsive thereto, may set and/or provide authentication tokens, cookies, and/or other identification data for authenticating the identity of the user.

The content customization engine 122 includes computer logic executable by the processor(s) 204 (e.g., see FIG. 2A) to customize content (e.g., a content page including customized results, which are customized to the user based on a tag expression) based on user interactions with interfaces presented by a user application. In particular, the content customization engine 122 may generate and resolve tag expressions to determine products relevant to the user. In some implementations, the content customization engine 122 is executable to determine tags, build expressions using the tags, query for products using the expressions, filter the products, adapt the presentation of the products to the capabilities of user applications, provide the products to for presentation to the user 106, etc.

Figure 9:
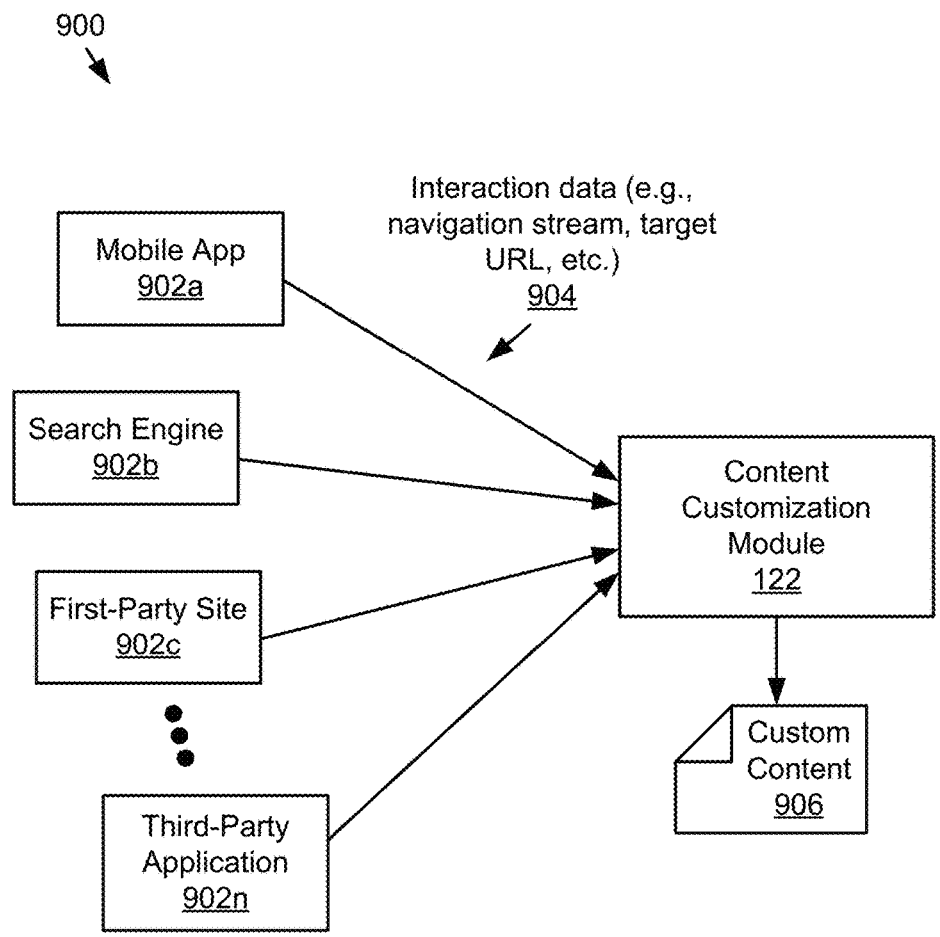
FIG. 9 is an example data flow diagram illustrating interaction data aggregation and content customization.

FIG. 9 is an example data flow diagram 900 illustrating interaction data aggregation and content customization. The diagram 900 includes several different example data sources 902a ... n from which interaction data (e.g., which describes an interaction by the user with a page) can be aggregated, including a mobile application 902a, a search engine 902b, a first-party site 902c, and a third-party application 902n. The sources 902a ... n each provide interaction data 904 (e.g., search engine search terms used to identify target URL, target URL, series of URLs user selected to arrive at target page, referrer URL, etc.) to a content customization module 122. The content customization module 122 processes the received interaction data, generates and resolves tag expressions, and determines customized content based on the resolution of the tag expressions, and provides the customized content for display to the user 106 on the user's user device 112. Thus, the system 100 is capable of determining the routing of a user and customizing the content based on that routing. Moreover, the above process is iterative and can further learn the user routing and preferences, and further customize the content (content may include results and may be referred to herein simply as results) to the user. It is also capable of being suspended and resumed, regardless of whether the user is using the same or a different user device 112.

Additional acts, structure, and/or functionality of the content customization engine 122 are described below with reference to at least FIGS. 2A-8.

The mobile application 902a may include an application on a user device 112, which tracks user behavior. For example, the mobile application may be a merchant application via which the user interacts with an enterprise server 120. The search engine 902b may include, for example, an internet search engine (e.g., Google, Bing, Yahoo, etc.) into which a user enters a search query. For example, the content customization module 122 may receive a search query from a search engine 902b and use the search query to create tags, tag expressions, and customize content as described herein. The first-party site 902c may include, for example, a website associated with an enterprise server 120, which tracks the behavior of the user at each step of the user's interaction with the website. For example, the first-party site 902c may include a merchant website which tracks the path of the user as the user searches on the website, views products, views categories, etc. The third-party application 902n may include, for example, interaction data gathered by a third-party application regarding user behavior. For example, a third-party application 902n may include a tracking application on a computer, browser, a user device, etc., which tracks the actions of a user.

Returning to FIG. 1, the third-party server 130 may include one or more computing devices having data processing, storing, and communication capabilities. For example, the third-party server 130 may include one or more hardware servers, server arrays, storage devices and/or systems, etc. In some implementations, the third-party server 130 may include one or more virtual servers, which operate in a host server environment and access the physical hardware of the host server including, for example, a processor, memory, storage, network interfaces, etc., via an abstraction layer (e.g., a virtual machine manager). In some implementations, the third-party server 130 may include a web server (not shown), a REST (representational state transfer) service, or other server type, having structure and/or functionality for satisfying content requests (e.g., a request to send a content page to a user device associated with a user) and receiving content (e.g., a content page including results, products, etc.) from one or more computing devices that are coupled to the network 102 (e.g., the user device 112, etc.).

The third-party server 130 may store and/or execute software, logic, and/or routines to provide various services such as video, music and multimedia hosting, distribution, and sharing; email; social networking; blogging; microblogging; photo management; cloud-based data storage and sharing; federated identity authentication service, a combination of one or more of the foregoing services; or any other service where users store, retrieve, collaborate, and/or share information, purchase products, transact business, etc.

It should be understood that the system 100 illustrated in FIG. 1 is representative of an example system, and that a variety of different system environments and configurations are contemplated and are within the scope of the present disclosure. For instance, various functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or additional computing devices or systems, etc.

Figure 2A:
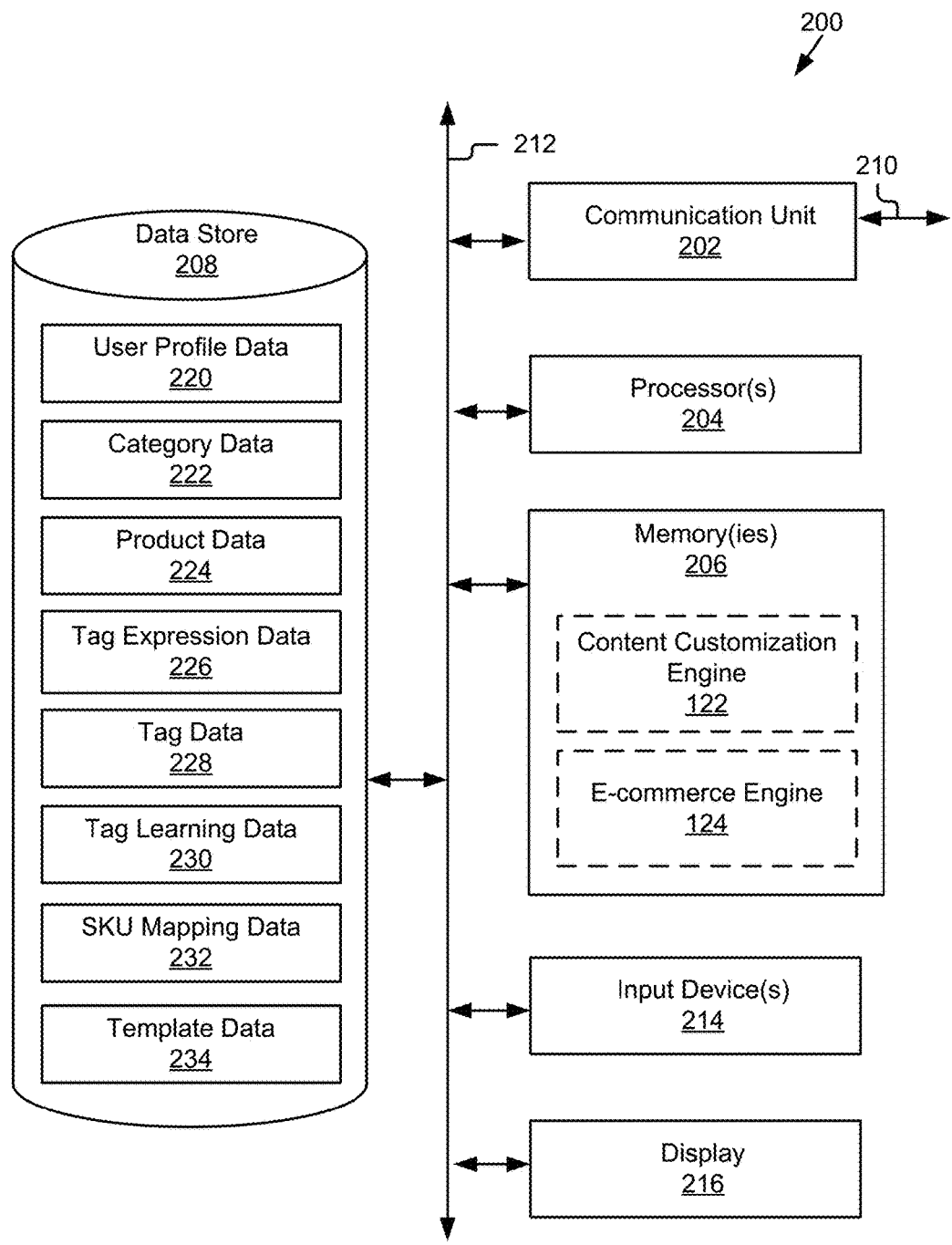
FIG. 2A is a block diagram illustrating an example computing system.

FIG. 2A is a block diagram of an example computing system 200. The example computing system 200 may represent the computer architecture of a user device 112, an enterprise server 120, and/or a third-party server 130, depending on the implementation. As depicted, the computing system 200 may include a processor(s) 204, a memory(ies) 206, a communication unit 202, a data store 208, input device(s) 214, and a display 216, which may be communicatively coupled by a communication bus 212. The computing system 200 depicted in FIG. 2A is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations.

The processor(s) 204 may execute software instructions by performing various input, logical, and/or mathematical operations. The processor(s) 204 may have various computing architectures to process data signals including, for example, a complex instruction set computer (CISC) architecture, a reduced instruction set computer (RISC) architecture, and/or an architecture implementing a combination of instruction sets. The processor(s) 204 may be physical and/or virtual, and may include a single core or plurality of processing units and/or cores. In some implementations, the processor(s) 204 may be capable of generating and providing electronic display signals to a display device, supporting the display of images, capturing and transmitting images, performing complex tasks including various types of feature extraction and sampling, etc. In some implementations, the processor(s) 204 may be coupled to the memory(ies) 206 via the bus 212 to access data and instructions therefrom and store data therein. The bus 212 may couple the processor(s) 204 to the other components of the enterprise server 120 including, for example, the memory(ies) 206, the communication unit 202, the input device(s) 214, the display 216, and the data store 208.

The memory(ies) 206 may store and provide access to data to the other components of the computing system 200. The memory(ies) 206 may be included in a single computing device or a plurality of computing devices. In some implementations, the memory(ies) 206 may store instructions and/or data that may be executed by the processor(s) 204. For example, as depicted in FIG. 2A, the memory(ies) 206 may store the content customization engine 122, the e-commerce engine 124, and their respective components, depending on the configuration. The memory(ies) 206 is also capable of storing other instructions and data, including, for example, an operating system, hardware drivers, other software applications, databases, etc. The memory(ies) 206 may be coupled to the bus 212 for communication with the processor(s) 204 and the other components of computing system 200.

The memory(ies) 206 include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 204. In some implementations, the memory(ies) 206 may include one or more of volatile memory and non-volatile memory. For example, the memory(ies) 206 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 206 may be a single device or may include multiple types of devices and configurations.

The bus 212 can include a communication bus for transferring data between components of a computing device or between computing devices, a network bus system including the network 102 or portions thereof, a processor mesh, a combination thereof, etc. In some implementations, the content customization engine 122, the e-commerce engine 124, and various other components operating on the enterprise server 120 (operating systems, device drivers, etc.) may cooperate and communicate via a communication mechanism included in or implemented in association with the bus 212. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity with the network 102 and the other components of the system 100, for example, the user device 112, the enterprise server 120, the third-party server 130, etc. For instance, the communication unit 202 may include, but is not limited to, CAT-type interfaces; wireless transceivers for sending and receiving signals using Wi-Fi™; Bluetooth®, IrDA™, Z-Wave™, ZigBee®, cellular communications, etc.; USB interfaces; various combinations thereof; etc. The communication unit 202 may include radio transceivers (e.g., 5G+, 4G, 3G, 2G, etc.) for communication with the network 102, and radio transceivers for Wi-Fi™ and close-proximity/personal area (e.g., Bluetooth®, NFC, etc.) connectivity, geo-location transceivers (e.g., GPS) for receiving and providing location information for the corresponding device, and the like. The communication unit 202 may be coupled to the other components of the computing system 200 via the bus 212. The communication unit 202 may be coupled to the network 102 as illustrated by the signal line 210. In some implementations, the communication unit 202 can link the processor(s) 204 to the network 102, which may in turn be coupled to other processing systems. The communication unit 202 can provide other connections to the network 102 and to other entities of the system 100 using various standard communication protocols, including, for example, those discussed elsewhere herein.

The data store 208 is an information source for storing and providing access to data. The data stored by the data store 208 may be organized and queried using various criteria including any type of data stored by them, such as a user/customer identifier, rewards account number, product identifier, product name, product category, tags, locations, merchant, user device, electronic address, where products were purchased from, etc. The data store 208 may include data tables, databases, or other organized collections of data. Examples of the types of data stored by the data store 208 may include, but are not limited to, user profile data 220, category data 222, product data 224, tag expression data 226, tag data 228, tag learning data 230, SKU mapping data 232, and/or template data 234, as discussed elsewhere herein.

The data store 208 may be included in the computing system 200 or in another computing system and/or storage system distinct from but coupled to or accessible by the computing system 200. The data store 208 can include one or more non-transitory computer-readable mediums for storing the data. In some implementations, the data store 208 may be incorporated with the memory(ies) 206 or may be distinct therefrom. In some implementations, the data store 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

The user profile data 220 describes the users of the system 100. The user profile data 220 includes the user accounts of the users and stores attributes describing the users. Non-limiting examples of user attributes include an e-mail address, IP address, demographics data, user id, rewards account number, product identifier, etc. In some implementations, the user profile data 220 includes information learned from user behavior (e.g., interaction data) through various computer-learning methods, as discussed elsewhere herein. In some implementations, the user profile data 220 includes information provided by a user, such as a username, password, preference data, payment information, etc.

The user profile data 220 may include interaction data tracking current and past interactions with the enterprise server 120 and, in some implementations, other servers (e.g., a third-party server 130). The interaction data includes history data, which is an aggregation of past behavior of the user. Non-limiting examples of past user behavior include webpages the user 106 has visited, items (e.g., pages, elements on a page, etc.) the user 106 has interacted with (e.g., typed, clicked, hovered over, etc.), Internet searches the user 106 has made, etc.

The category data 222 includes a set of product categories. Each category may include a plurality of products. The products included in the categories may be linked with the products in the product data 224. Each category may be characterized using one or more tags. The tags characterizing the categories may be linked with the tags in the tag data 228.

The product data 224 includes a plurality of product records respectively describing products available via the e-commerce engine 124. Users may interact with customized interfaces presented by the system 100 to browse and/or purchase products. Each product record may describe the various aspects of the products. Each record may include one or more product tags characterizing the product. The product tags may be linked with the tags in the tag data 228. Each record may also include unique product identifiers, names, descriptions, manufacturer info, specifications, photos, videos, reviews, ratings, etc. for products.

The tag expression data 226 includes tag expressions generated by the content customization engine 122. In some implementations, each tag expression is assigned to a particular user 106, such as the visiting user. The tag expression may additionally and/or alternatively be associated with a particular category, calendar, product, page (e.g., webpage, interface, etc.), for example. In some implementations, the tag expression data 226 is linked to user profile data 220 to associate the tag expressions with corresponding users.

A tag expression is a logical expression combining tags with Boolean logic operators. Example Boolean logic operators include, but are not limited to, AND ("&&"), OR ("||"), NOT ("!"), parentheses, etc. In some implementations, the tag expression (e.g., the configuration and ordering of the tags, operators, etc.) is dynamically built for and/or adapted to a particular user, object, content item, etc. For example, the example tag expression may be generated dynamically by the tag expression engine 258 (e.g., see FIGS. 2A and 2B). In an example, a tag expression may be: (('dress' && 'wedding') && 'white' ||('football' && 'university')) && !'Flashplayer'. The example tag expression may result from a user being interested in both weddings and sports (not necessarily together), but whose user device 112 lacks Flashplayer capability.

The tag data 228 includes a list of tags which can be associated with page items, such as but not limited to categories, products, product attributes (e.g., specifications, images, reviews, related products, etc.), page components (e.g., a menu, a tool bar, other content regions, etc.), applications, page modes, users 106, etc. Tags may be (user) defined by a stakeholder, such as an administrator or developer, may be dynamically determined by analyzing present and historical data, may be learned over time from user 106 interaction, product descriptions, content items, etc. In a further example, when an administrator adds a page, or code for creating a page, to the e-commerce engine 124, the page or code, or an associated data source, such as the data store 208, may include certain predefined tag(s) and/or certain predefined tag expression(s) configured to pull products matching certain category tag(s), or products matching certain product tag(s), so that when the page is loaded/code is executed, the corresponding products will be determined by the resolver(s) 260 and provided in an interface by the e-commerce engine 124 and/or the application being used by the user on his/her user device 112.

A tag may include a word or symbol characterizing the item, such page and/or page element (e.g., link, container, product, menu item, etc.), system, season, date, merchandiser, location, etc., to which it is associated. In an example, tags may include key value pairs. The key may correspond to a classification and the value may define the value for that classification. Non-limiting examples are as follows:

| Key | Value |
| --- | --- |
| Site: | Premium, standard, etc. |
| Year: | 2014, 2013, 2012, etc. |
| Category: | Product category names, such as Cards, Merry Christmas, Holiday, etc. |
| Custom: | User/merchandiser-specific, etc., sale-related, etc. |
| System: | Device info, Application info, 3D, 2D, system requirements, etc. |
| Country: | Mexico, Canada, US, etc. |
| Province/State: | British Columbia, Ontario, Texas, etc. |
| Special day: | Company-specific, a designated holiday, etc. |
| Fulfillment: | A certain vendor ID, requirements, SKU mapping ID, etc. |

In some implementations, the tags in the tag data 228 include a list of synonyms which can be used by the content customization engine 122 to determine a tag based on a keyword or piece of data about a webpage, etc., as discussed elsewhere herein. In some implementations, the tag data 228 maps the relationships between tags. For instance, the tag data 228 maps the ontology of the tags reflecting how the tags are related. Non-limiting examples include the relationships between categories and subcategories of tags.

Tag learning data 230 reflects tags being learned by the content customization engine 122 based on user interactions and the page content, such as but not limited to product categories, products, advertisements, etc. In some implementations, the content customization engine 122 may learn tags based on a comparison between keywords extracted from interaction data and keywords associated with pages rendered for display based on content determined by the content customization engine 122.

More particularly, in some implementations, the tag learning data may include an association between a tag from the tag data 228 and a keyword, which has been learned by the system due to previous interactions by users 106. The keyword may reflect a value for that tag. For example, if a user 106 visited a page with the keyword "white dress" and then visited a page about weddings, the tagging module 260 (see FIG. 2B) may learn that dresses, or more particularly, white dresses are a sub-category of weddings and include that sub-categorization as a value for a category tag in a tag expression to retrieve more pertinent content for the user and/or store that association in the tag learning data 230 for further learning. The tag learning data 228 may include confidence scores for the tag values being learned for the various tag categories, and once a sufficient confidence score threshold has been met, the value may be associated with the tag in the tag data 228.

SKU mapping data 232 includes information regarding the stock keeping unit ("SKU") of a product. The SKU includes attributes for tracking the identity of a product. As different vendors may have different SKUs for the same product, the SKU mapping data associates the different SKUs so the e-commerce engine 124 can place an order with the appropriate vendor via the vendor's server for the correct product. Stated another way, SKUs describing the same product may vary between different sources, so the SKU mapping data 232 stores the associations between the different SKUs so that the product can easily be recognized across different servers, for example. In an example, the SKU mapping data 232 may map the SKUs of a product for a merchant and for a supplier so they can be easily cross-referenced by the merchant and/or the supplier. In some implementations, the SKU mapping data 232 may be linked with the product data 224. For example, a particular product may have a set of information about it stored in a table, including keywords, tags, and SKUs for the product according to different sources.

Template data 234 includes templates associated with different contents. In some implementations, template data 234 may include different levels of formatting for certain products, where specific format to be used to display the products is determined by the site mode selector 262. For example, the site mode selector 262 may determine that a particular mode should be presented to the user 106 based on a mode tag included in a tag expression, so the site mode selector 262 retrieves a template corresponding to the particular mode specified by the mode tag, populates the template with certain content retrieved based on the tag expression, and presents the personalized content/page to the user 106.

In an example, a 3-D depiction of a product and a 2-D depiction of a product may be stored in the data store 208. If the user's application is capable of rendering the 3-D depiction of the product satisfactorily to the user, the site mode selector 262 will select the 3-D template and populate it with the 3-D depiction of the product, which the user's application will then render to the user. However, if the user's application is not capable of satisfactorily rendering the 3-D depiction of the product, the site mode selector 262 will select the 2-D template and populate it with the 2-D depiction of the product so the user's application does not bog down, freeze, crash, or otherwise incorrectly display the product.

The input device(s) 214 may include any device for inputting information into the computing system 200. In some implementations, the input device(s) 214 may include one or more peripheral devices. For example, the input device(s) 214 may include a keyboard (e.g., a QWERTY keyboard), a pointing device (e.g., a mouse or touchpad), microphone, an image/video capture device (e.g., camera), etc. In some implementations, the input devices 214 may include a touch-screen display capable of receiving input from the one or more fingers of the user. For instance, the structure and/or functionality of one or more of the input device(s) 214 and the display 216 may be integrated, and a user of the computing system 200 may interact with the computing system 200 by contacting a surface of the display 216 using one or more fingers. In this example, the user could interact with an emulated (i.e., virtual or soft) keyboard displayed on the touch-screen display 216 by using fingers to contact the display in the keyboard regions.

The display 216 may display electronic images and data output by the computing system 200 for presentation to a user 106. The display 216 may include any conventional display device, monitor or screen, including, for example, an organic light-emitting diode (OLED) display, a liquid crystal display (LCD), etc. In some implementations, the display 216 may be a touch-screen display capable of receiving input from one or more fingers of a user 106. For example, the display 216 may be a capacitive touch-screen display capable of detecting and interpreting multiple points of contact with the display surface. In some implementations, the computing system 200 may include a graphics adapter (not shown) for rendering and outputting the images and data for presentation on display 216. The graphics adapter (not shown) may be a separate processing device including a separate processor and memory (not shown) or may be integrated with the processor(s) 204 and memory(ies) 206.

As depicted in FIG. 2A, the computing system 200 may include a content customization engine 122 and an e-commerce engine 124. These components 122 and 124 may be communicatively coupled by the bus 212 and/or the processor(s) 204 to one another and/or the other components 202, 204, and 208 of the computing system 200. In some implementations, one or more of the components 122 and 124 may include computer logic executable by the processor(s) 204 to provide their acts and/or functionality. In any of the foregoing implementations, these components 122 and 124 may be adapted for cooperation and communication with the processor(s) 204 and other components of the computing system 200.

The content customization engine 122 is coupled to the e-commerce engine 124 to exchange information and coupled to the data store 208 to store, retrieve, and/or manipulate data stored therein. Likewise, the e-commerce engine 124 is coupled to the content customization engine 122 to exchange information and coupled to the data store 208 to store, retrieve, and/or manipulate data stored therein.

Figure 2B:
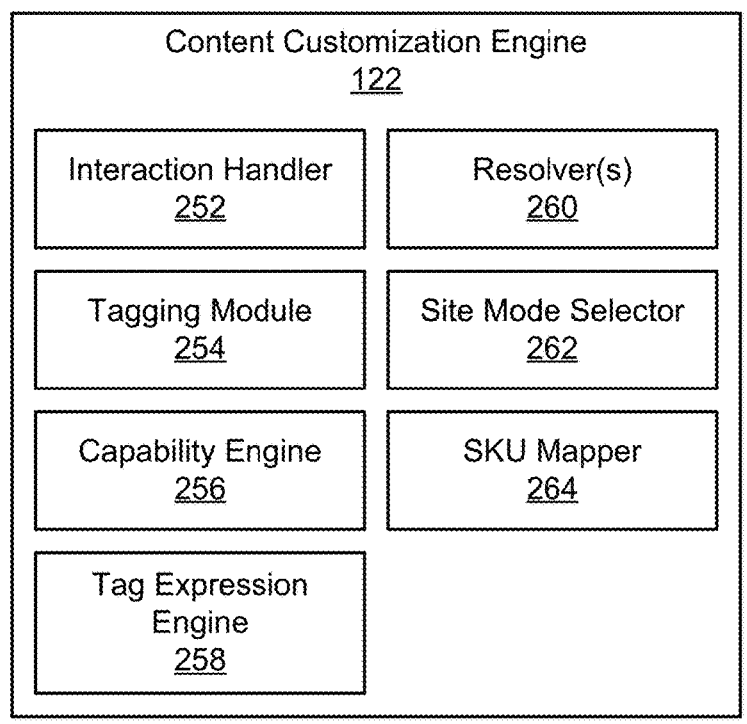
FIG. 2B is a block diagram illustrating an example implementation of a content customization engine.

FIG. 2B is a block diagram of an example content customization engine 122. As depicted, the content customization engine 122 includes an interaction handler 252, a tagging module 254, a capability engine 256, a tag expression engine 258, one or more resolvers 260, a site mode selector 262, and a SKU mapper 264.

The components 252, 254, 256, 258, 260, 262, 264, and/or 124 may be communicatively coupled by the bus 212 and/or the processor(s) 204 to one another and/or the other components 202, 204, and 208 of the computing system 200. In some implementations, one or more of the components 252, 254, 256, 258, 260, 262, 264, and/or 124 may include computer logic executable by the processor(s) 204 to provide their acts and/or functionality. In any of the foregoing implementations, these components 252, 254, 256, 258, 260, 262, 264, and/or 124 may be adapted for cooperation and communication with the processor(s) 204 and other components of the computing system 200, such as the data store 208 and/or the memory(ies) 206.

The interaction handler 252 may include computer logic executable by the processor(s) 204 to receive user interactions from a user device 112, determine user identity, and communicate with other components of the content customization engine 122 and/or the e-commerce engine 124. The interaction handler 252 may receive interaction data from the user device 112 and stores the interaction data in the data store 208 (e.g., the interaction handler 252 may associate and store the association of the interaction data with a user profile of the user as user profile data 220 in the data store 208) as user profile data 220 and/or provide the interaction data to the other components of the content customization engine 122. The interaction handler 252 may use the interaction data, among other things, to identify users and/or associate the interaction data with the corresponding users, as described in reference to at least FIG. 3 below, for example. The interaction handler 252 may pass requests to other components of the content customization engine 122 to instruct the other components to modify and/or use the interaction data to perform their operations.

The tagging module 254 may include computer logic executable by the processor(s) 204 to determine tags. In some implementations, the tag key associated with a particular page may be predefined and the tagging module 254 may dynamically determine the value for the tag key. In some implementations, the tagging module 254 may determine both the tag key and value. In some implementations, the tag may be fully predefined and the tagging module 254 may identify the tag for use in the tag expression. The tagging module 254 may determine the tags based on the interaction data received from the user's user device 112 and processed by the interaction handler 252. For instance, the tagging module 254 receives interaction data from the interaction handler 252 and/or from the data store 208 and uses the interaction data to determine tags for the objects that are the subject of the interaction data. Objects may include a URL, a product, a product category, a page of a site, a topic, an advertisement, a merchant, a user, etc.

In some implementations, the tagging module 254 may automatically tag a page or aspects of a page with tags, which, when interacted with, may be identified and used by the tag expression engine 258 to build the tag expression. In an example, the tagging module 254 may tag unique URLs served by the e-commerce engine 124 with tags customized to the URLs by storing the association between the tags in the memory(ies) 206 and/or the data store 208 for later access by the other components of the content customization engine 122. In some implementations, a page and/or its aspects may be manually tagged by a stakeholder, such as an administrator and/or developer, and the tagging module 254 may determine these tags and provide them to the tag expression engine 258. In some implementations, the tagging module 254 may be capable of learning new tag values as discussed elsewhere herein, for instance with reference to FIGS. 4A and 4B.

Additional structure, acts, and/or functionality of the tagging module 254 may be described below with reference to FIGS. 3-9.

The capability engine 256 may include computer logic executable by a processor(s) 204 to determine the capabilities of a user device 112 and set the value of a corresponding tag based thereon. In some instances, the value may reflect the specific level of computing ability of the user's system (e.g., application and/or user device 112). In some implementations, the capability engine 256 may store the capabilities of the applications used by the user in the user's profile data 220. The tag set by the capability engine 256 may be used by the site mode selector 262 to match the capabilities of the user device 112 with the system requirements of a particular content item.

The capability engine 256 may be coupled to the tagging module 254 to send and receive data and/or instructions. For instance, the tagging module 254 may instruct the capability engine 256 to investigate the capability of a user's system and set the corresponding tag value (e.g., tag value for a system tag). The capability engine 256 may be coupled to the data store 208 to store, retrieve, and/or manipulate data.

The tag expression engine 258 may include computer logic executable by a processor(s) 204 to build tag expressions. The tag expression engine 258 uses the tags associated with the interaction data to create a tag expression as described in further detail in reference to FIG. 3-6 below. The tag expression engine 265 may be coupled to receive the tag(s) from the tagging module 254, the data store 208, or another component. The tag expression engine 258 can assign the tag expression(s) to the user associated with the interaction data. The tag can store the association between tag expressions and users in the data store 208 as tag expression data 226. Tag expressions may uniquely characterize the context of the target page, such as the URL being presently accessed by the user. Non-limiting examples of various tag expressions are discussed elsewhere herein.

In some implementations, the tag expression engine 258 may receive a capability tag, as determined by the capability engine 256, to build the tag expression. The tag expression engine 258 can store tag expressions as tag expression data 226 in the data store 208 for later access and/or retrieval by it and/or other components of the content customization engine 122 and/or may be coupled to and provide the tag expressions directly to the other components of the content customization engine 122 as needed, such as the resolver(s) 260.

Additional structure, acts, and/or functionality of the tag expression engine 258 may be described below with reference to FIGS. 3-9.

The resolver(s) 260 may include computer logic executable by a processor(s) 204 to resolve tag expressions. The resolver(s) may be coupled to the other components of the content customization engine 122 to exchange data, and may be coupled to the data store 208 to store, retrieve, and/or otherwise manipulate data. The resolver(s) 260 may be coupled to the e-commerce engine 124 and/or the user applications to provide products determined by them based on the resolution of tag expressions, which may be presented in interfaces rendered by the user applications.

The resolver(s) 260 may receive a tag expression from the tag expression engine 258 and/or the data store 208 and processes the tag expression to determine which content to provide for display on the user's user device 112. The resolver(s) 260 may send the resolved content to the site mode selector 262, the e-commerce engine 124, the user's user application, etc., for processing thereby. In some implementations, the resolver(s) 260 may store the resolved content in the data store 208 for access by other components of the content customization engine 122 and/or the e-commerce engine 124, as described elsewhere herein.

In some implementations, the resolver(s) 260 may determine which products embodied by the product data 224 match a given tag expression. For example, the tag expression may state that a user is interested in creating a photo book in print, which includes color photographs, text, and that can be printed within 24 hours. The resolver(s) 260, using the tag expression, determines corresponding content, such as a set of matching products, and the content for presentation (e.g., in conjunction with other components of the system 100), as discussed elsewhere herein.

In some implementations, a resolver(s) 260 may embody a calendar resolver configured to resolve a calendar. The resolver(s) 260 receives a tag expression and uses it to render a calendar matching the requirements of the tag expression. For example, if a tag expression indicates that a user is from Canada, works for Company A, and is a fan of Manchester United, the resolver(s) 260 would render a calendar for the user which includes Canadian holidays, specific calendar information for Company A (as, for example, retrieved from a company website or entered by an administrator), and dates that Manchester United is playing. The following table depicts further non-limiting examples describing possible expressions and the dates which may be output and used by the calendar resolver to generate a calendar.

| Template | Expression | Description |
|---|---|---|
| Canada Holiday | 'Country:Canada' && 'Year:2014' | Get all Canadian holiday for 2014 |
| Canada Holiday with BC holiday | ('merry Christmas' && '2014') \|\| ('ProvinceState:BC' && '2014') | Get all Canadian holiday and BC holiday for 2014 |

In some implementations, the resolver(s) 260 may embody a category resolver configured to resolve one or more categories. The resolver(s) 260 receives a tag expression and interprets it to determine which category(ies) match the category(ies) and Boolean logic of the tag expression, and may then query for products matching the interpretation of the expression. In the below examples, each tag expression includes at least one category variation. As shown, resolution of the tag expression 'happy holidays' II 'custom' would result in the retrieval by a resolver(s) 260 of all products with 'happy holidays' or 'custom' tags; and resolution of the tag expression ('merry Christmas' && '2014') ||'custom' would result in the retrieval by a resolver(s) 260 of all products with 'merry Christmas' and '2014' tags or 'custom' tag. Thus, users determined as interested in Christmas may be presented with products relating specifically to Christmas and users interested more broadly in the holidays may be presented with products relating thereto.

| Template | Expression | Description |
|---|---|---|
| Happy Holidays | 'happy holidays' \|\| 'custom' | Get all products with 'happy holidays' or 'custom' tags |
| Merry Christmas | ('merry Christmas' && '2014') \|\| 'custom' | Get all products with 'merry Christmas' and '2014' tags or 'custom' tag. |

In an example, a resolver(s) 260 may heuristically determine a category based on interaction data. For instance, if a dynamically generated tag expression (e.g., generated based on search terms input by a user) specifies that a user is interested in dresses, which are long and white, and in flowers, the resolver(s) 260, can, using the tag data 228, resolve categories of wedding and dresses and query for dresses tagged with both of those tags.

In some implementations, the tag expression engine 258 may set and include various tags in a tag expression based on the user's interactions. For example, if a user searched for premium cards, the tag expression engine 258 may include a corresponding tag in the tag expression so premium cards may be displayed. If the user searched for customizable cards, the tag expression engine 265 may include a corresponding tag in the tag expression so customizable cards may be displayed. In further examples, the type of products and/or categories may be based on which links were selected by the user, and the tag expression engine 258 may build the tag expression based on tags corresponding to the unique links. Other variations are also possible and contemplated.

Figure 7:
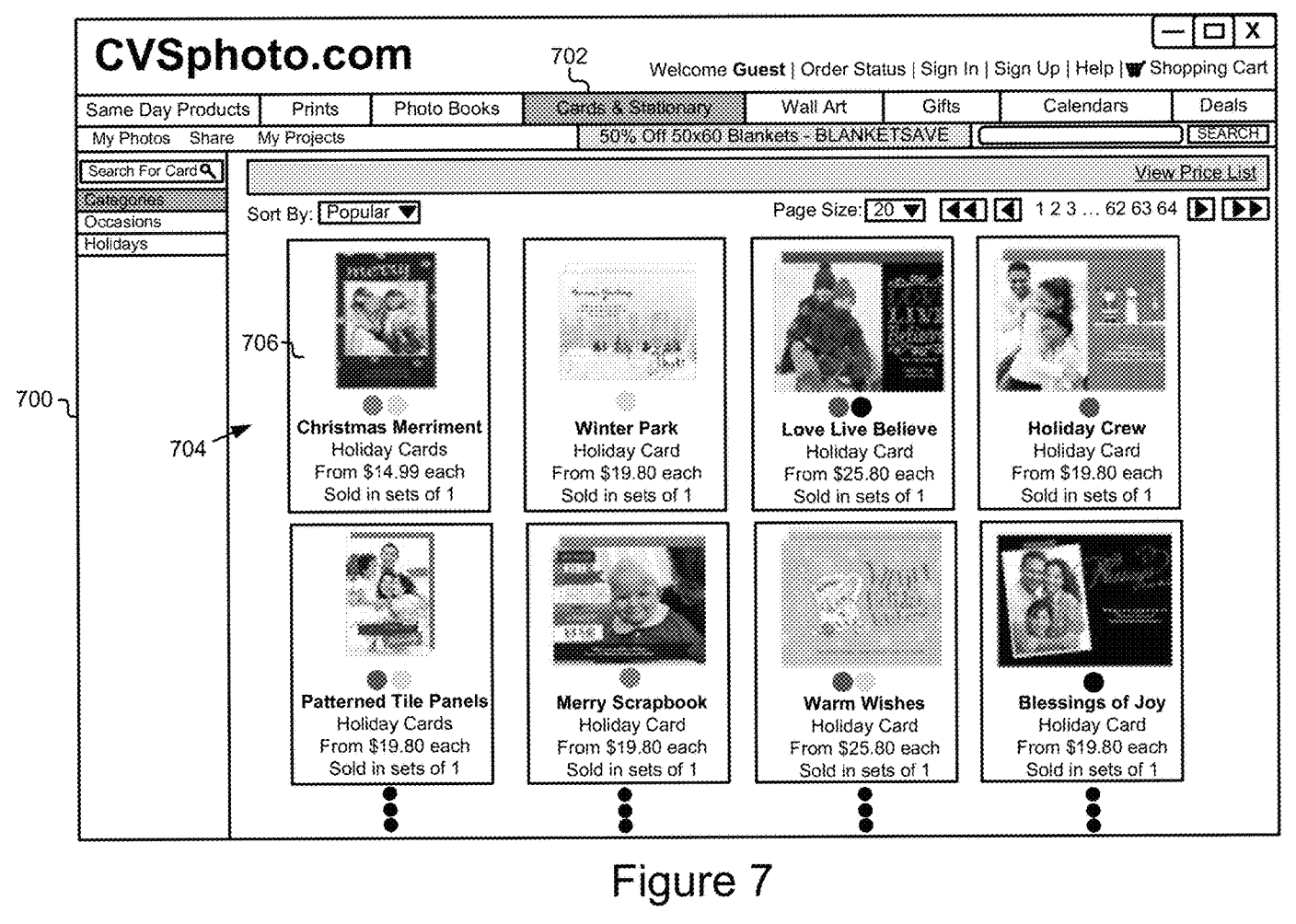

FIG. 7 is an example graphical user interface 700 showing a category as resolved by the resolver(s) 260. In the depicted implementation, a user has selected to view a page for cards & stationary 702 on the interface, in response to which the resolver(s) 260 has selected products matching a category "Merry Christmas", which may be determined based on tags and logic expressing the season, year, an category of cards, or based on the category tag "Merry Christmas", etc., as discussed elsewhere herein. In some implementations, the products within this category may also be resolved by the resolver(s) 260 based on the tag expression. The interface 700 includes list of products, such as product 706, that correspond to the category.

In some implementations, the resolver(s) 260 may dynamically resolve content based on the tag expression. For example, the resolver(s) 260 may be capable of recognizing new tags in a tag expression and resolving appropriate content based on those tags and the tag expression.

In some implementations, the resolver(s) 260 may retrieve a tag expression from, for example, the data store 208, which may be stored in association with the user's user profile, may determine content, which satisfies the tag expression, and may send the content for display to the user.

In some implementations, the resolver(s) 260 may interact with the tagging module 254 to recognize that a tag in the tag expression has been dynamically created and may intelligently resolve content based on the dynamic tag. For example, the tagging module 254 may recognize the tag as a dynamic tag and determine other possible tags and/or keywords that may match the dynamic tag, for instance, by matching the tag to known synonymous tags. The resolver(s) 260 may then query for content matching the matching tag(s). Numerous other variations are also possible as discussed elsewhere herein.

The site mode selector 262 may include computer logic executable by a processor(s) 204 to select a site mode. The site mode selector 262 may couple to and access, retrieve, and/or manipulate the product data 224, the tag expression data 226, and the template data 234, from the data store 208, for example. The site mode selector 262, the e-commerce engine 124, the user application, and/or another component may select a particular template from the template data 234 based on the tag expression and, in some implementations, may populate the template with products returned by the resolver(s) 260. In some implementations, the templates in the data store 208 may be indexed by capability level, and the template may be selected based on a corresponding tag (e.g., a system tag) in the tag expression used to resolve the content, as discussed elsewhere herein.

A site mode is any particular style of page, site, or interface (e.g., affecting a user interface displaying a content page). In some implementations, a site mode includes a method of displaying and/or organizing data on a webpage selected based on a tag expression, which may include a capability tag reflecting capabilities of the user device 112 associated with the user. For example, a site mode may include three dimensional content organized on a webpage in a particular manner. In some implementations, a site mode includes a particular type of webpage customized based on a tag expression. For example, a site mode may display a particular type of webpage corresponding to a tag expression, such as a "signature-card" content page as in FIG. 8A (as opposed to the regular card content page in FIG. 8B).

In some implementations, the site mode selector 262 may select a particular site mode based on a corresponding tag included in the tag expression. For instance, a resolver(s) 260 may resolve that the products being retrieved should be presented using a specific site mode based on a site tag included in the tag expression, and may signal the site mode selector 262 to select the corresponding site mode. As a further example, a site mode may be specified that is customized to a specific company. The look and feel of the site may be designed specific for that company, and the interfaces generated may include corresponding graphical elements.

In a further example, an interface can be partially and/or completely customized based on the URL that the user selected with which to access the interface. A corresponding tag may be included in the tag expression, and the resolver(s) 260 may trigger the site mode selector 262 to customize the interface accordingly based on the tag. The below table includes further examples of such.

| Site mode | Expression | Description |
| --- | --- | --- |
| Cards | 'cards' | Use standard mode |
| Signature-cards | 'signature-cards' | Use premium mode |

Figure 8A:
FIGS. 8A and 8B are example graphical user interfaces including a template and content areas as determined using a tag expression.

An example graphical user interface 800 is shown in FIG. 8A. As depicted, the interface includes a page including resolved content items. The template(s) used to format the page and/or its elements may be determined by the site mode selector 262, the reflecting the "mode" of the page. For example, the layout template for the depicted interface 800 is specific to "signature" cards.

The interface displays content that is customized to a user based on the user's tag expression. In the depicted implementation, a tag expression has dictated that the interface includes signature holiday cards. The title of the page 804 is customized based on the tag expression to indicate that the topic of the page is "signature cards & invitations". The interface 800 may also include advertisements and information customized based on the tag expression as in regions 806 and 808. In an example, the user may have selected the link 802 and, responsive thereto, the content customization engine 122 generated a corresponding tag expression based on the electronic address (e.g., URL) of the page 800 and retrieved the products displayed in regions 806 and 808. In another example, the user may have landed on the page 800 by searching for it using a search engine (e.g., provided by the third-party server 13) and be redirected to the page 800. Responsive to this, the content customization engine 122 generated a corresponding tag expression based on the user's navigation history and/or the electronic address (e.g., URL) of the current page 800 and retrieved the products displayed in regions 806 and 808.

Figure 8B:
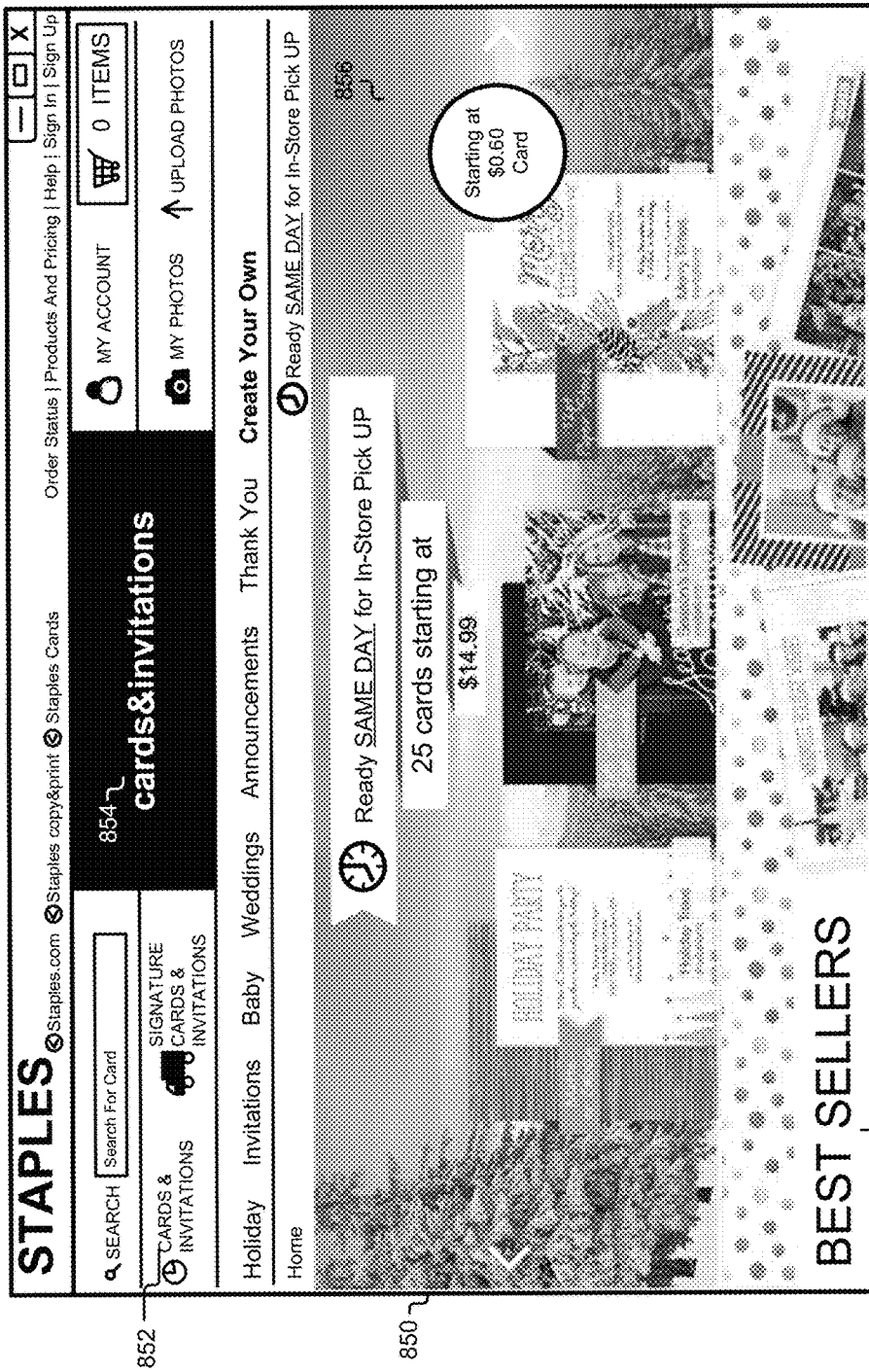

A further example graphical user interface 850 is shown in FIG. 8B. The interface 850 displays the same type of content (e.g., greeting cards) as that in FIG. 8A, however the template reflects a different mode as selected by the site mode selector 262. The template for the depicted interface 850 is for standard holiday cards. The interface 850 includes content regions 856 and 858, which may be resolved based on the tag expression for the specific mode depicted. The title 854 is customized based on the tag expression to indicate that the page topic is standard "cards & invitations". The user may have arrived at this page based on the selection of link 852, a search, a referrer link, or another routing.

Returning to FIG. 2B, the SKU mapper 264 may include computer logic executable by a processor(s) 204 to map different product SKUs referencing the same product. The different product SKUs may correspond to different computing systems and/or vendor operations to which the SKUs correspond, such as the enterprise server 120 and one or more third-party servers 130.

In some implementations, the mappings may be entered by a stakeholder, such as a vendor desiring to map its product SKU to the product SKU of a product stored in the product data 224. The e-commerce engine 124, in an implementation, may provide a corresponding interface to the stakeholder for mapping its product SKU to a product SKU corresponding to the e-commerce engine 124.

The SKU mapper 264 receives product SKU (e.g., a unique identifier) associated with one vendor and may query the SKU mapping data 232 associated with that product SKU to determine which other product SKUs match. For example, the SKU mapper 264 may map the product SKU for a product available for purchase on an enterprise server 120 to the manufacturer of the product based on the stored attributes (e.g., vendor, product ID, product SKU ID, etc.) of each SKU object. The SKU mapper 264 may be coupled to the data store 208 to store, retrieve and/or manipulate data, and/or may be coupled to the other components of the content customization engine 222 and/or the e-commerce engine 124 to exchange data.

In a further example, the SKU mapper 264 include an expression and may use the expression to query the SKU mapping data 232 in the data store 208 to determine an appropriate product SKU. In some implementations, a resolver(s) 260 may signal the SKU mapper 264 to identify the SKU based on a fulfillment tag or merchant tag (e.g., identifying a certain vendor) included in the tag expression, which may be provided by the resolver(s) 260 and/or the SKU mapper 264 to the e-commerce engine 124 for use thereby to place the order with the vendor for the product using the proper product SKU, which advantageously saves the vendor time as the vendor can be certain of the product SKU and forgo having to verify it before fulfilling the order.

Figure 3:
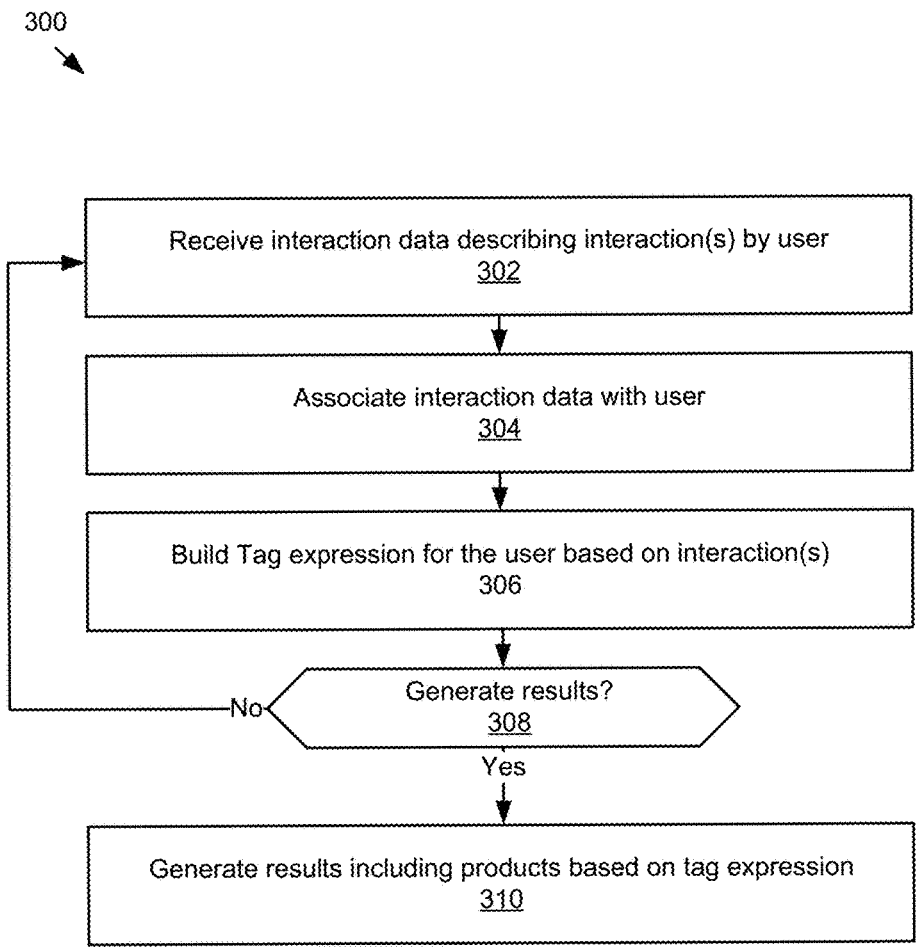
FIG. 3 is a flowchart of an example method for generating results including products based on one or more tag expressions.

FIG. 3 is a flowchart of an example method 300 for generating results including products based on one or more tag expressions. In block 302, the interaction handler 252 receives interaction data describing one or more interactions by a user with one or more applications (e.g., with one or more pages presented on a user devices of the user by, for example, an application). As discussed elsewhere herein, interaction data may include but is not limited to a target page URL, a user's click stream, referrer URL, and/or search terms used to find a target page URL, etc., depending on the implementation. Non-limiting examples of applications include a mobile app, a first-party website, third-party website, a native application, etc. In some implementations, interaction data may be transmitted by a data aggregation application, such as an advertising and/or analytics widget embedded in an application (e.g., browser, a mobile app, etc.). In some implementations, interaction data may include requests for content from an application operable on a user device (e.g., a browser, a mobile app, etc.), such as a request for a webpage, an asynchronous request for a structure dataset (e.g., JSON, XML, etc.), etc.

In block 304, the interaction handler 252 may associate interaction data with the user. In some implementations, the interaction handler 252 may determine unique identifier for the user and associate the interaction data with the unique identifier, which the interaction handler 252 and/or other components of the content customization engine 122 may utilize when handling the interaction data.

In some implementations, the user may be identifiable using an authentication token and/or cookie (e.g., set by the when the user authenticated with the content customization engine 122), which the interaction handler 252 may use to identify the user. The interaction handler 252 may then associate the interaction data with a unique identifier corresponding to the user, so the content customization engine 122 may keep track of which user the interaction data corresponds to. In some implementations, the interaction handler 252 or another component may parse user attributes from the interaction data, such as but not limited to the user's (general or specific) geographic location, the application and/or device the user is using to interact with the content customization engine 122, which the interaction handler 252 or another component may, in some cases, use to identify and/or further determine attributes (e.g., a location, etc.) for the user. As a further example, if the user specific identity is unknown to the interaction handler 252, the interaction handler 252 or another component may determine an approximate identity for the user based on the user's location, type of user device 112 the user is using, the application the user is using, information accessible from the data aggregators (e.g., based on an IP address associated with the user), etc.

In block 306, the tag expression engine 258 may build tag expression(s) for the user based on the interaction(s) described by the interaction data. In some implementations, the tag expression engine 258 may use tags derived from the interaction data with which to build the expression by coupling together tags (existing tags, new tags, etc. as described elsewhere herein) using Boolean logic operators in a logical expression.

In some implementations, a tag expression may be built based on the interaction of the user with a specific page. In an example, the user may, via an application (e.g., a browser, a mobile app, etc.) operable by the user device 112, arrive at a page served at least in part by the e-commerce engine 124 for display by the application. The user's navigation history may be received by the interaction handler 252, processed, and used by the tag expression engine 258 to build a tag expression (e.g., a tag or predetermined tag is incorporated into the tag expression) describing the context for the user's visit to the page.

In an example, the user may, via an application (e.g., browser, mobile app, etc.) operable by the user device 112, request a specific electronic address (e.g., URL) associated with particular product or group of products, which the e-commerce engine 124 may serve to the user device 112 of the user for display by the application. Upon loading the requested page associated with the address, the tag expression engine 258 may dynamically build a tag expression including tags reflecting the context of the webpage, such as the root the user took to get to the address, the content of the webpage, calendar information such as the time of year of the request and whether that specific date is a special date (e.g., holiday, the day of a special sale, the relevant birthday, etc.).

In some implementations, the tag expression engine 258 may build a tag expression for a particular user over time. For instance, on a first visit, the tag expression engine 258 may initialize a tag expression for the user based on the context of the first visit, and then on a second visit, third visit, and further subsequent visits the tag expression engine 258 may use and/or further develop the tag expression. This is particularly advantageous in a case where the user may be accessing an online service provided by the enterprise server 120 from different devices at different times during the day and/or week, as it allows the content customization engine 122 to provide the user with a consistent, customized user experience regardless of the user device 112 being used. Alternatively, in some implementations, the tag expression engine 258 may build a discrete tag expression for each visit of the user.

In block 310, a resolver(s) 260 may generate customized results (customized results may also referred to herein simply as result(s)) including products based on the tag expression(s) (e.g., a customized result includes a product customized to the user based on the tag expression and tags associated with each result) responsive to a determination at block 308 to generate results. In some implementations, a resolver(s) 260 may interpret the tags included in the tag expression(s) and the product data 224 in the data store 208 for products with corresponding tags. By way of example and not limitation, a set of products may each include a set of product tags describing the characteristics of that product, which may be stored in the data store 208 as product data 224, as discussed elsewhere herein. The results may be utilized in a number of ways, such as stored in the data store 208 for later access and/or retrieval, incorporated into interfaces generated and provided to the user for display (e.g., by the e-commerce engine 124, etc.), incorporated into messages (e.g., emails, texts, social network posts, etc.), etc.

The resolver(s) 260 may generate customized results including the page items matching the tags and Boolean logic operators in the tag expression. For example, a customized result generated by the resolver(s) 260 may include any number of page items, or arrangement thereof, that correspond to the tag expression.

The customized results may be displayed on a customized content page for the user. The content page is customized to the user based on the tag expression in such a way that the user sees relevant information displayed in a relevant way on a relevant interface, for example.

It should be understood that this method 300 is compatible and may be combined, in whole or in part, with the other methods and operations discussed herein including methods 400, 500, and 600. In some instances, various blocks and/or sequences of blocks of the methods 400, 500, and/or 600 are extensions of the various blocks of the method 300.

Figure 4A:
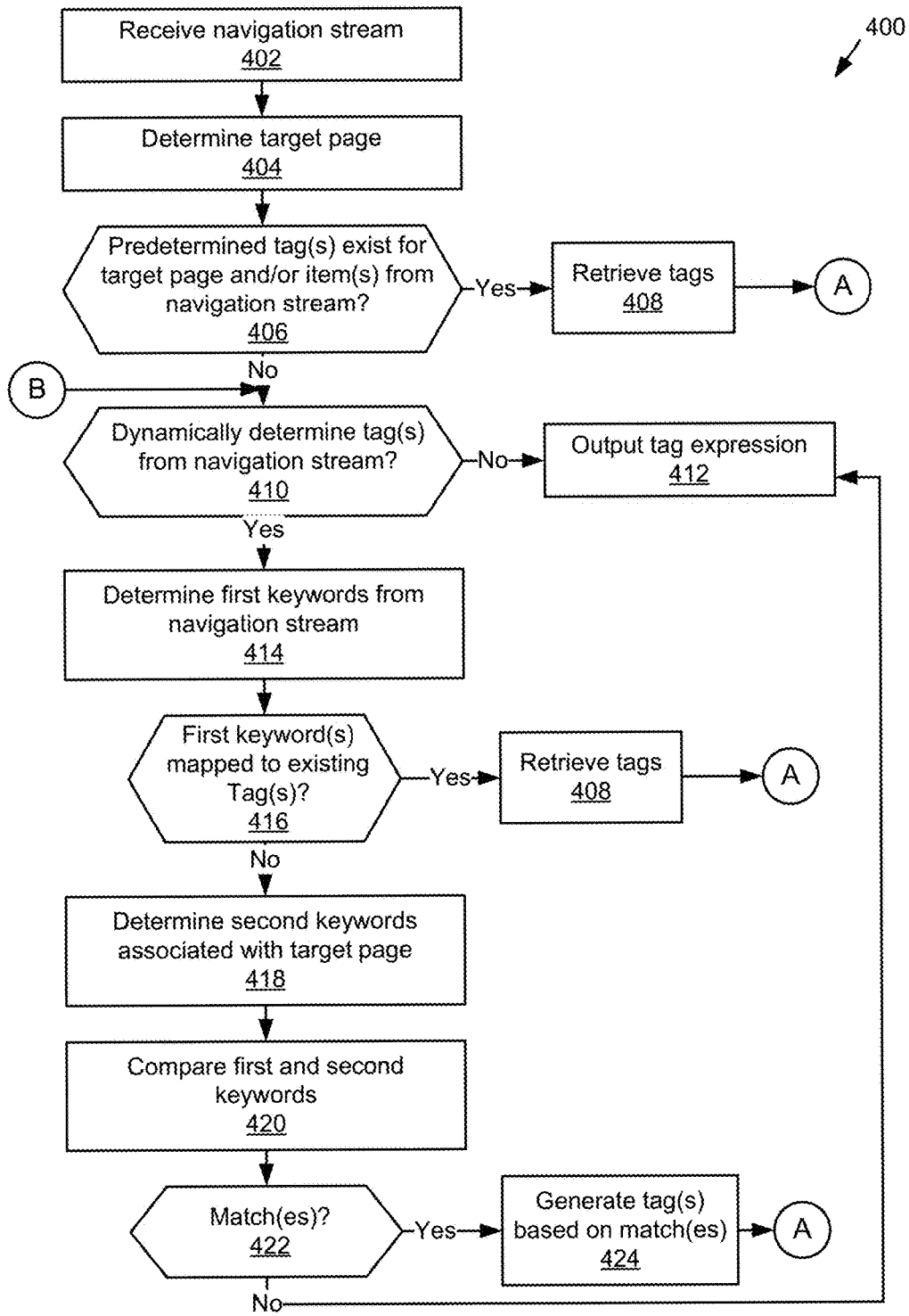
FIGS. 4A and 4B are flowcharts of an example method for determining tags and dynamically building a tag expression.
Figure 4B:
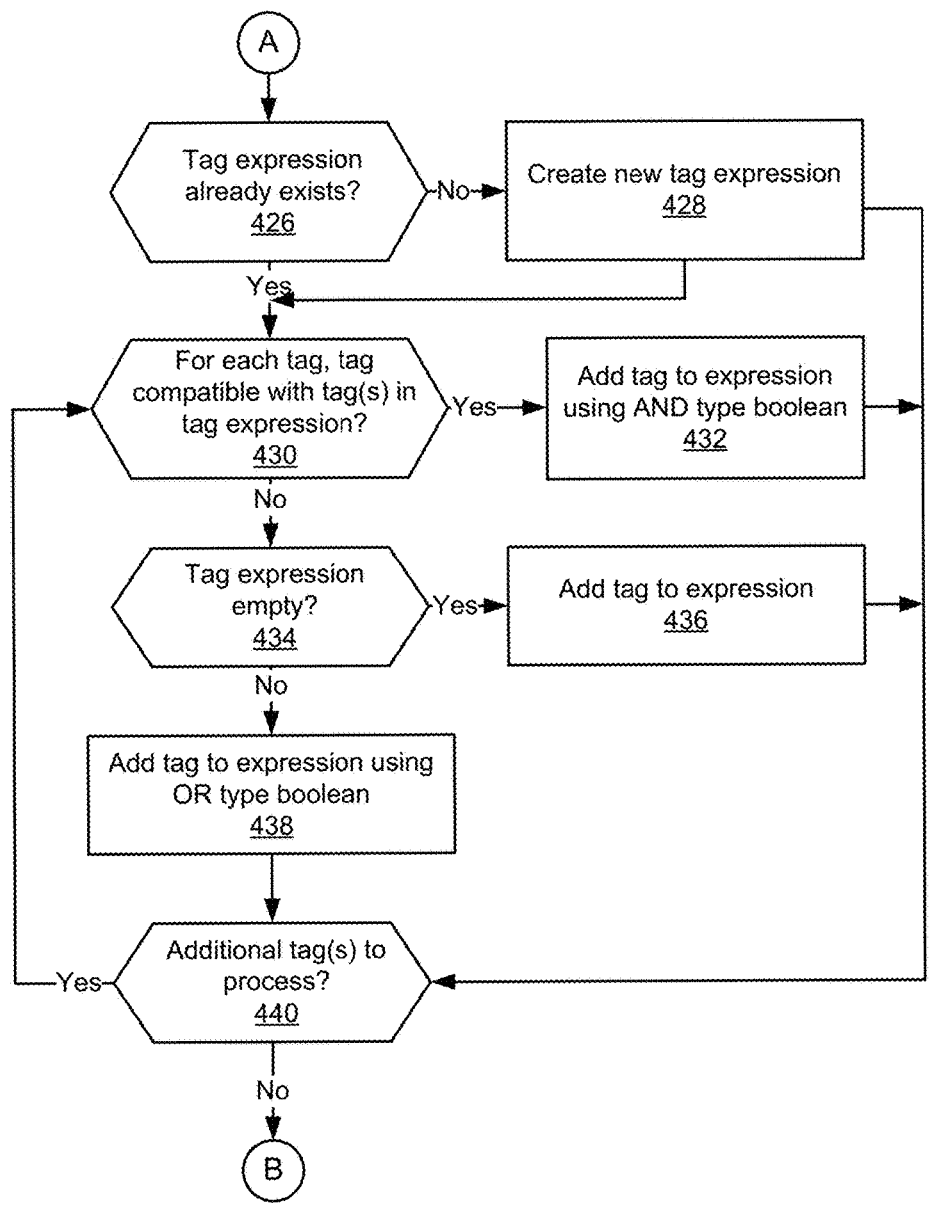

FIGS. 4A and 4B are flowcharts of an example method 400 for determining tags and dynamically building a tag expression. In block 402, the interaction handler 252 receives interaction data, such as a navigation stream. The navigation stream may describe a series of one or more user actions that the user has taken using an application operable by the user's user device 112 to arrive at the target page. In an example, the navigation stream may include a referrer data, such as a referrer URL and/or search terms used at the referrer site to find the target page.

In block 404, the interaction handler 252 determines the target page. In some implementations, the user using an application operable by the user's user device 112 may submit a request for data associated with the product page, such as, but not limited to, a page associated with a product or a category of products, to the e-commerce engine 124, and the interaction handler 252 may determine that page as the target page. In some implementations, the user may access a given product category page using a mobile application, and the interaction handler 252 may determine that page as the target page. Other variations are also possible and contemplated.

In block 406, the tagging module 254 may determine whether predetermined tag(s) exist (e.g., exist and/or are already associated/pre-associated with the target page) for the target page and/or for item(s) from the navigation stream. If the determination in block 406 is affirmative (e.g., a target page and an existing tag are already associated), the tagging module 254 retrieves the predetermined tag(s) in block 408 from a data source, such as the memory(ies) 206 and/or the data store 208, and the method 400 then proceeds to block 426, which is discussed further below. In an example, a merchant may predefine certain tags for a given page, such as the target page, which the tag expression engine 258 may use to build the tag expression, as discussed elsewhere herein.

If the determination in block 406 is negative, the tagging module 254 determines whether to dynamically determine tag(s) from the navigation stream at block 410. If the determination in block 410 is negative, the tag expression engine 258 outputs 412 the tag expression, or may throw an error if no tags were determined by the method 400 and no corresponding tag expression was built.

If the determination in block 410 is affirmative, the tagging module 254 may determine 414 a set of keywords from the navigation stream (referred to herein as first keywords for clarity and ease of understanding) and then determine in block 416 whether any of the first key words are mapped to existing tag(s). In some implementations, certain keywords may be mapped to certain tags in the tag data 228 stored in the data store 208, and the tagging module 254 may query the tag data 228 for any tags corresponding to the keywords. If the determination in block 416 is affirmative, the tagging module 254 may retrieve 408 those tags from a data source, such as the memory(ies) 206 and/or the data store 208, and the method 400 then proceeds to block 426, which is further discussed below.

If the determination in block 416 is negative, the tagging module 254 may proceed to block 418 and determine a set of keywords associated with the target page (referred to herein as second keywords for clarity and ease of understanding). In some implementations, one or more keywords may be predefined for the target page. For example, but not limitation, keywords describing the theme or subject of the target page, items included in the target page, originality and/or seasonality associated with the target page, etc., may be predefined automatically by the e-commerce engine 124 and/or may be entered by a stakeholder, such as an administrator or developer and stored in the data store 208 as tag data 228 in association with the target page.

In some implementations, one or more keywords may be dynamically generated based on the content of the target page, such as the subject of the target page, the summary of the target page, descriptive terms included in the metadata, hyperlinks included in the page, or more of words of the title, where categories associated with the page, an event associated with the page, etc.

Responsive to determining the first keywords and the second keywords, the tagging module 254 may compare the first and second keywords in block 420 and may determine any matches in block 422. If any matches are determined in block 422, the tagging module 254 may generate tag(s) (e.g., one or more new tags) based on the match(es) in block 424 (e.g., based on the attributes of the target page).

The method 400 then proceeds to block 426, in which the tag expression engine 258 determines whether a tag expression already exists. If the determination in block 426 is negative, the tag expression engine 258 creates a new tag expression in block 428 and then proceeds to block 430. If the determination in block 426 is affirmative, the tag expression engine 258 proceeds to block 430 and begins processing each of the tags received responsive to the operations in blocks 408 and/or 424. In particular, the tag expression engine 258 determines whether the tag for consideration is compatible (e.g., belongs to the same category, type, genre, tone, etc.) with or more tags in the tag expression at block 430. If the determination in block 430 is affirmative, the tag expression engine 258 adds the tag to the tag expression using an AND Boolean type at block 432. In an example, if the tag expression includes a first tag, such as a site tag or category tag, and the tag under consideration is a compatible tag, such as a date tag or a sub category tag that corresponds to a category tag, the tag expression engine 122 may concatenate the text of the existing expression with "AND" and the tag itself.

If the determination in block 430 is negative, the tag expression engine 258 determines in block 434 whether the tag expression is empty, and if so adds 436 the tag to the expression. Since the tag added to the expression is the only tag in the expression, no Boolean is necessary. The method 400 then proceeds to block 442 process any additional tags. If the determination in block 434 is negative, the tag expression engine 258 adds the tag to the expression using an OR type Boolean at block 438. In an example, if the tag expression includes a first tag, such as a site tag or category tag, and the tag under consideration is a non-compatible tag, such as a custom tag or a sub category tag that does not correspond to a category tag, the tag expression engine 122 may concatenate the text of the existing expression with "OR" and the tag itself. It should be understood that the above examples are provided by way of illustration and that other logic including more complex Boolean logic may be generated for the tag expression with the tags using various combinations of the tags, parenthesis, and Booleans, and/or other suitable known logical operators, etc.

In block 440, the tag expression engine 258 determines whether any additional tags remain to process, and if so, returns to block 430 to iteratively process the remaining tags. If no tags remain to process, the method 400 returns to block 410 and the tagging module 254 determines whether to dynamically determine tag(s) from the navigation stream. In the case that the tag(s) have already been dynamically determined from the navigation stream, the method proceeds to 412 and the tag expression engine 258 may output the tag expression 412. In some implementations, tag expression engine 258 outputs 412 the tag expression to one or more of the resolvers 260 for processing thereby, as discussed elsewhere herein.

Figure 5:
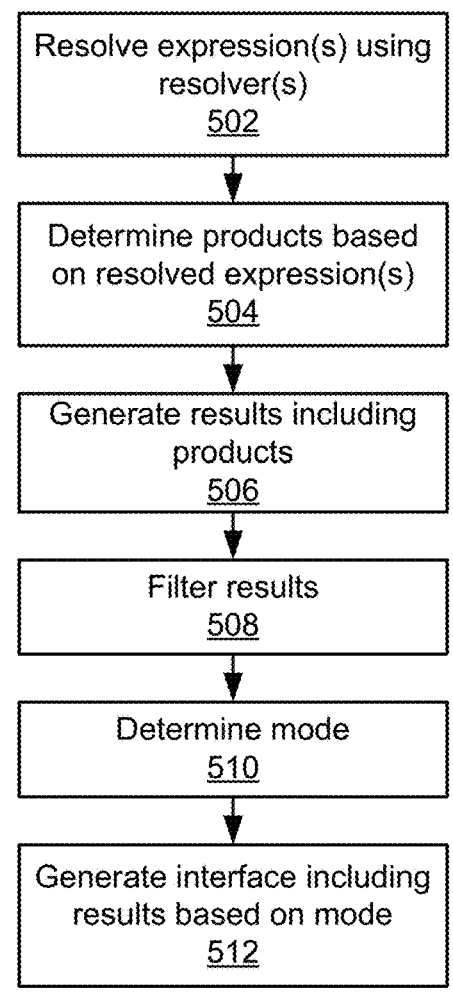
FIG. 5 is a flowchart of an example method for resolving tag expression(s) and generating and providing results.

FIG. 5 is a flowchart of an example method 500 for resolving tag expression(s) and generating and providing results. In block 502, one or more resolvers 260 resolve one or more tag expressions generated by the tag expression engine 258 and determine in block 504 products based on the resolved expression(s). In block 506, the resolver(s) 260 generate results including the products. In some implementations, the resolver(s) 260 may filter the results, as well. Next, the site mode selector 222 determines 510 a mode for presenting the results. In some implementations, the mode may be determined based on the application that is slated to receive the results, as discussed elsewhere herein. Next, the e-commerce engine 124 and/or the application operable on the user's user device 112 may generate 512 an interface including the results based on the mode. For example, the e-commerce engine 124 may generate a webpage catered to display the results in a rich, 3-D format based on a determination that the application the user is using is capable of rendering the results to the user in a satisfying way.

Figure 6:
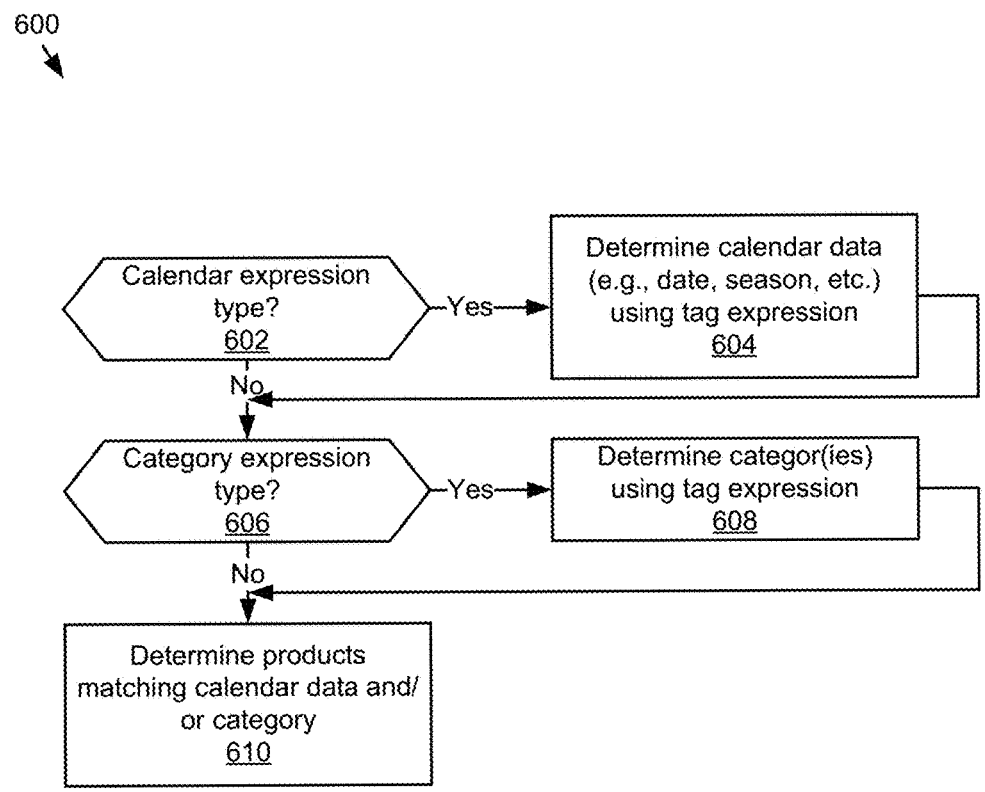
FIG. 6 is a flowchart of an example method for resolving a tag expression.

FIG. 6 is a flowchart of an example method 600 for resolving a tag expression. In block 602, a resolver(s) 260 may determine whether the tag expression includes a calendar expression type, and if so may determine in block 604 calendar data such as but not limited to a date (e.g., a year, month, etc.), a season, etc., using the tag expression. For example, for the calendar data, the resolver(s) 260 may parse the tag expression for tag types that correspond to a calendar. The method 600 then proceeds to block 606.

If the determination in block 602 is negative, the method 600 may proceed to block 606 and determine whether the tag expression includes a category expression type, and if so may determine in block 608 one or more category(ies) using the tag expression. For example, for the category(ies), the resolver(s) 260 may parse the tag expression for tag types defining one or more category(ies).

Next, the resolver(s) 260 may determine products matching the calendar data and/or the category(ies) at block 610. In some implementations, the resolver(s) 260 may interpret the Boolean logic included in the tag expression in conjunction with the calendar data and/or the category(ies) and use the interpretation of that logic to query the product data 224 in the data store for products that match.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   receiving, using one or more computing devices, interaction data describing interactions by a user with one or more pages presented on a user device of the user, the one or more pages including a target page;
   generating, using the one or more computing devices, one or more tags based on attributes of the target page;
   building, using the one or more computing devices, a tag expression by coupling a plurality of tags together using Boolean logic operators for the user based on the interaction data, the plurality of tags including the one or more generated tags, the tag expression including a logical expression of the plurality of tags and the Boolean logic operators, the plurality of tags being associated with page items; and
   generating, using the one or more computing devices, a content page including a customized result including a product customized to the user based on the tag expression by incorporating page items matching the plurality of tags and Boolean logic operators in the tag expression into the customized result.

2. The computer-implemented method of claim 1, further comprising:
   receiving, using the one or more computing devices, a request to send the content page to the user device associated with the user; and
   sending, using the one or more computing devices, the content page including the customized result to the user device for presentation to the user.

3. The computer-implemented method of claim 1, further comprising:
   associating, using the one or more computing devices, the interaction data with a user profile of the user in a non-transitory data store;
   determining, using the one or more computing devices, an interaction by the user with the target page included in the one or more pages, the interaction being described by the interaction data; and
   determining, using the one or more computing devices, one or more tags associated with the target page.

4. The computer-implemented method of claim 3, wherein
   determining the one or more tags associated with the target page includes determining, using the one or more computing devices, that a predetermined tag exists and is pre-associated with the target page in the non-transitory data store, and retrieving, using the one or more computing devices, the predetermined tag for the target page from the non-transitory data store, and
   building the tag expression for the user based on the interaction data includes incorporating the predetermined tag into the tag expression.

5. The computer-implemented method of claim 1, wherein coupling the plurality of tags together using Boolean logic operators includes coupling, using the one or more computing devices, compatible tags together using an AND type Boolean operator, and coupling, using the one or more computing devices, incompatible tags together using an OR type Boolean operator.

6. The computer-implemented method of claim 1, wherein the page items include a site mode affecting a user interface displaying the content page.

7. The computer-implemented method of claim 6, wherein the tag expression includes a capability tag reflecting a capability of the user device associated with the user, and the site mode is selected based on the capability tag.

8. A computing system comprising:
   one or more memories;
   one or more processors;
   an interaction handler storable in the one or more memories and executable by the one or more processors to receive interaction data describing interactions by a user with one or more pages presented on a user device of the user, the one or more pages including a target page;
   a tagging module storable in the one or more memories and executable by the one or more processors to generate one or more tags based on attributes of the target page;
   a tag expression engine storable in the one or more memories and executable by the one or more processors to build a tag expression by coupling a plurality of tags together using Boolean logic operators for the user based on the interaction data, the plurality of tags including the one or more generated tags, the tag expression including a logical expression of the plurality of tags and the Boolean logic operators, the plurality of tags being associated with page items; and
   a resolver storable in the one or more memories and executable by the one or more processors to generate a content page including a customized result including a product customized to the user based on the tag expression by incorporating page items matching the plurality of tags and Boolean logic operators in the tag expression into the customized result, the interaction handler, the tag expression engine, and the resolver being coupled for communication with one another.

9. The computing system of claim 8, further comprising an e-commerce engine storable in the one or more memories executable by the one or more processors to:
   receive a request to send the content page to the user device associated with the user; and
   send the content page including the customized result to the user device for presentation to the user.

10. The computing system of claim 8, wherein:

the computing system further comprises a non-transitory data store;

the interaction handler is further configured to associate the interaction data with a user profile of the user in the non-transitory data store and determine an interaction by the user with the target page included in the one or more pages, the interaction being described by the interaction data; and the tagging module storable in the one or more memories is further executable by the one or more processors to determine one or more tags associated with the target page.

11. The computing system of claim 10, wherein the tag expression engine is further executable to determine one or more tags associated with the target page by determining that a predetermined tag exists and is pre-associated with the target page in the non-transitory data store; and retrieving the predetermined tag for the target page from the non-transitory data store, and the tag expression engine is further executable to build the tag expression for the user based on the interaction data by incorporating the predetermined tag into the tag expression.

12. The computing system of claim 8, wherein coupling the plurality of tags together using Boolean logic includes coupling compatible tags together using an AND type Boolean operator, and coupling incompatible tags together using an OR type Boolean operator.

13. The computing system of claim 8, wherein the page items include a site mode affecting a user interface displaying the content page.

14. The computing system of claim 13, wherein the tag expression includes a capability tag reflecting a capability of the user device associated with the user, and the site mode is selected based on the capability tag.

\* \* \* \* \*